May 31, 1960   M. HILL   2,938,240
GILL BOXES

Filed May 13, 1957   2 Sheets-Sheet 1

Inventor
Moore Hill

By
Holcomb, Wetheill & Rowden
Attorneys

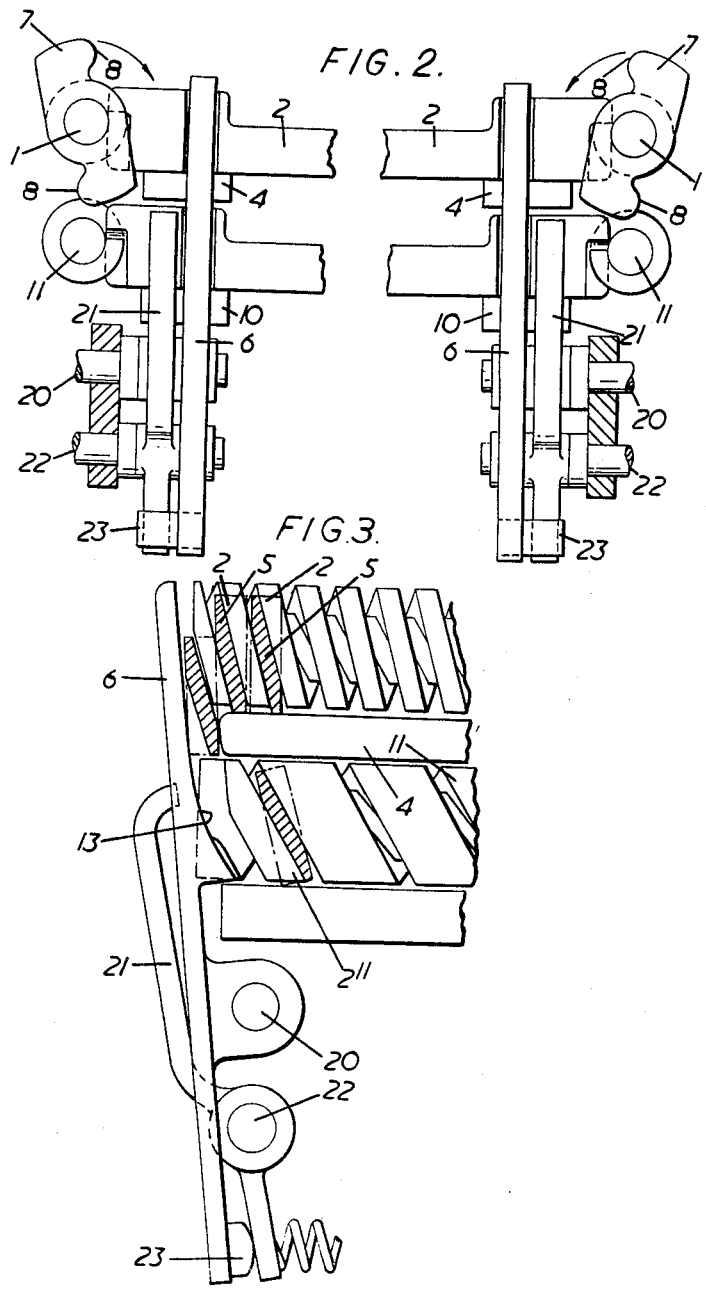

United States Patent Office 2,938,240
Patented May 31, 1960

2,938,240
GILL BOXES

Moore Hill, Belfast, Northern Ireland, assignor to James Mackie & Sons Limited, Belfast, Northern Ireland, a British company Filed May 13, 1957, Ser. No. 658,635

Claims priority, application Great Britain May 17, 1956

8 Claims. (Cl. 19—129)

This invention relates to screw gill boxes as are used for the treatment of textile fibres. In such machines, the fallers are fed along the gill bed by a pair of feed screws, and at the end of their travel, that is to say the point at which the gill pins disengage the fibres, the fallers are transferred from the feed screws to a pair of return screws by means of a pair of cams. These cams rotate with the feed screws and have usually either two or three projections according to whether the feed screws have double-start or triple-start threads, being known as either double cams or triple cams respectively. In moving from the feed screws to the return screws the fallers normally move downwardly but, in the case of intersecting gill boxes, the lower set of fallers move downwardly while the upper set move upwardly.

During their passage from one pair of screws to the other the fallers are controlled by movable guides which ensure that the ends of the fallers move into engagement with the return screws. In the usual form of construction, these guides are pivoted and spring-loaded so that, when one faller reaches the end of its feed screws, the guide is forced back against its spring to leave a gap between the guide and the end of the feed screw support slide for the passage of the faller under the control of its cams. The faller then passes along the guide into engagement with the return screw but, under high speeds of operation, there is a tendency for the faller to rebound from the return screw support slide, thus causing damage to the machine.

According to the present invention an additional pusher mechanism acts on each successive faller to push it away from the guides along the beginning of its return path. The effect of this is to tend to make the vertical movement of the faller merge into its horizontal return movement so that it passes relatively smoothly round the corner and the tendency to rebound is reduced. In this way the speed of operation which has previously been severely limited owing to the damage caused by rebounding fallers may be considerably increased. Since the speed at which the gill box can be operated controls the outcome of the machine of which it forms a part, the speed of the whole machine may be increased correspondingly.

In normal constructions of gill box the guides are designed so that the the end of its vertical travel each faller is in approximately the correct angular position to suit the pitch of the thread of the return screw. One result of this is that in rebounding there is a danger that the faller will damage the cams. Moreover, due to the fact that the entry to the threads of the return screw is broadened out to form a bugle mouth to facilitate the entry of the end of the faller, there is an instantaneous pause before the return screws take over the control of the faller. Preferably therefore the pusher mechanism acts on each faller in such a way as to tend to move it into a more nearly upright position. Thus when the fallers are moving downwardly from the feed screw to the return screw the pusher mechanism is required to act above the centre of gravity to achieve the necessary effect. Conversely in an intersecting gill box where the upper set of fallers are moving upwardly from the feed screws to the return screw the pusher mechanism is required to act below the centre of gravity of each faller.

The more nearly upright position of the faller means that if there is a rebound the faller is less likely to come into contact with the cams and will instead engage the underside of the feed screw support slide which is considerably more robust and able to withstand the impact. In addition, the ends of the faller are pressed into contact with the leading face of the thread on each return screw so that the return screws take over the control of each faller smoothly and without any appreciable interruption. By reducing the mechanical shocks the fallers in these ways the effects of fatigue, which are normally very marked when operating at high speeds, are also considerably reduced. Thus the increased speed of operation which may be obtained with a construction in accordance with the invention does not lead to a corresponding decrease in the life of the fallers.

Preferably the pusher mechanism is mounted so as to rock under the control of the guides. Consequently as the guides are moved back by the downward passage of each faller so the pusher mechanism is also rocked back to allow the movement of the faller. As the guides move inwardly again the pusher mechanism also rocks inwardly to engage the faller and exert the required pushing action on it so as to move it away from the guides. As alternatives to controlling the movement of the pusher mechanism by the movement of the guides, the pusher mechanism may be controlled by a cam or cams driven from the feed screws, or rotating cams working in synchronism with the guides may themselves act directly on the fallers so as to constitute the pusher mechanism.

A construction in accordance with the invention will now be described in more detail by way of example with reference to the accompanying drawings in which:

Figure 2 is an end view of the mechanism shown in Figure 1; and

Figure 3 is a view similar to Figure 1 but showing a different stage in the operation of the pusher mechanism.

Figure 1:
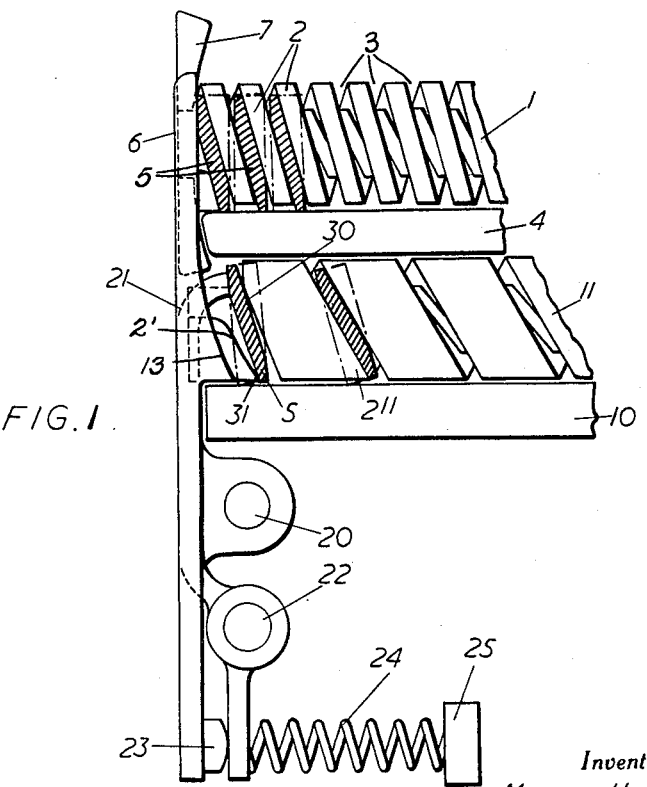
Figure 1 is a diagrammatic view of part of a known form of screw gill box showing the end of the feed screw, the beginning of the return screw and the guide for controlling the movement of fallers between the two as modified for cooperation with a novel pusher mechanism in accordance with this invention.

Turning first to Figure 1 for an understanding of the difficulty overcome by this invention; the feed screw 1 serves to feed a number of fallers 2, one of which is located in each of the threads 3 but only three of which are shown in the drawing. The fallers are supported during their movement under the control of the feed screw on the feed screw support slide 4. As seen, the main body of each faller, shown by the dotted rectangle, is upright but it is formed with a sloping end portion, shown by the shaded area 5, which is sloped slightly for engagement with the threads 3.

As each faller reaches the end of the feed screw 1 and of the support slide 4 it forces back a pair of guides, one of which is seen at 6, being pivotally mounted on a fixed shaft 20, and the other of which is in a corresponding position on the other side of the gill box. At the instant when the guide 6 has been forced back far enough to allow the end faller bar to pass between the guide and the end of the support slide 4, a rotary cam 7, seen better in Figure 2, engages the upper surface of the faller and forces it downwardly through the gap. The cam 7, seen in Figure 2 has two operative projections 8, being known as a double cam, and co-operates with a double-start thread on the feed screw 1. For each revolution of the feed screw two fallers are fed downwardly by the cam 7. If the feed screw had a triple-start thread a triple cam having three projections would be required.

As the faller moves downwardly under the control of the cam 7 in the type of screw gill box as heretofore constructed it is guided by the curved inner surface of the guides 6 until it reaches a positon shown as 2'. As soon as the upper surface of the faller passes the end of the support slide 4 the guide 6 snaps back into the position shown in Figure 1 and immediately thereafter the faller engages the return screw support slide 10 with considerable impact, leading to rebounding. The return screw 11 has a thread 12 of considerably coarser pitch than the thread 4 of the feed screw 1 so as to produce a rapid return movement of the fallers. Consequently when being moved under the control of the return screw the fallers are in an inclined position, approximately as shown at 2". The lower part 13 of the curved surface of the guide 6 is shaped so that the faller in the position 2' is in the correct angular position for engagement with the threads of the return screw 11. But for the additional mechanism to be described, the rebounding of the faller in this position would bring it into engagement with the lower part of the cam 7 which is relatively delicate and susceptible to damage. Moreover, owing to the fact that the end thread of the return screw is broadened out to form a bugle mouth, the entrance of which is clearly shown in Figures 1 and 3, there is a certain amount of play between the sides of the thread and the sloping end portion 5 of the faller so that the faller would be given a considerable jolt as the return screw takes over control.

This is avoided, however, by the provision of a pusher mechanism comprising a member 21 working in association with each of the guides 6. Each member 21 is pivoted at 22 and is linked on the lower side of its pivot with a downward extension of the guide 6 by means of a cross member 23. Both the guides 6 and the pusher member 21 are acted on by a common compression spring 24, the other end of which engages a stationary part 25 of the machine. The effect of the spring 24 therefore is to move both the guides 6 and the pusher member 21 into the position shown in Figure 1.

When a faller reaches the end of the feed screw support slide 4 and is forced downwardly by the cam 7 into the position shown in Figure 3, the guide 6 has been moved back by the faller, consequently moving back at the same time the pusher member 21. This allows the faller to move downwardly until its upper edge clears the lower edge of the support slide 4, whereupon the guide 6 starts to move back towards the position of Figure 1. In view of the relative locations of the pivots 20 and 22 with respect to the common point constituted by the cross member 23, the pusher member 21 has greater angular movement than the guide 6. Consequently as the guide 6 rocks inwardly, the pusher member 21 rocks more rapidly, overtaking the guide 6 and coming into engagement with the faller just as or just before it comes into engagement with the return screw support slide 10. This rocks the faller in a clockwise direction, as seen in the drawings, into the more nearly upright position of Figure 1. The action of the pusher member tends to make the vertical movement of the faller merge more smoothly into its horizontal return movement and the fact that the faller is in a more nearly upright position ensures that if there is any rebound it will be with the undersurface of the feed screw support slide 4 which will not thereby be damaged. Any danger of the faller rebounding into contact with the cam 7 is positively avoided. Moreover, as is seen from Figure 1, the sloping end portion 5 of the faller 2 is in engagement at the top with the leading edge of the thread in the return screw at the point 30, while at the bottom it is in contact with the rear edge of the thread at the point 31. Consequently as the return screw takes over the control of the movement of the faller the latter is rocked into the position 2" and full engagement with the sides of the thread is established without any appreciable jolt or discontinuity.

I claim:

1. A screw gill box having a pair of feed screws, a pair of return screws, movable guides for controlling fallers during their passage from said feed screws to said return screws, and cyclically moving pusher mechanism acting on each successive faller to push it away from said guides along the beginning of said return screws.

2. A screw gill box according to claim 1 in which said pusher mechanism is pivotally mounted adjacent the respective guides to rock with said guides.

3. A screw gill box according to claim 2, in which both the guides and the pusher mechanism are pivoted, the latter at a greater distance from the axis of the return screw than the former, and both are held together by a force transmitting member at a point on the remote side of their pivots from the return screw, and a common control spring acting on said guides and pusher mechanism at said point.

4. In a screw gill box having a pair of feed screws, a pair of return screws and means for transferring fallers from the ends of said feed screws to the beginnings of said return screws, the combination of means for guiding said fallers during said transfer movement, pusher means acting in succession on each said faller and means for operating said pusher means in synchronism with movement of said guide means whereby each of said faller is pushed away from said guide means.

5. A screw gill box according to claim 4, in which said pusher means is formed with a relatively narrow contact surface for engagement with each said faller, said contact surface being so located in relation to the center of gravity of each faller as to tend to move it into a more nearly upright position.

6. A screw gill box according to claim 4 and including means mounting said pusher mechanism for rocking motion and resilient means for biasing said rocking motion.

7. In a screw gill box having a pair of feed screws, a pair of return screws and means for transferring fallers from the ends of said feed screws to the beginnings of said return screws, the combination of means for guiding said fallers during said transfer movement, means mounting said guide means for rocking movement, pusher means, means mounting said pusher means for rocking movement, and common resilient means acting on said guide means and said pusher means, whereby movement of said guide means caused by transfer of said fallers is transmitted to said pusher means, causing said pusher means to act in succession to push each said faller away from said guide means.

8. A screw gill box according to claim 7, in which said mounting means for said guide means is on the side of said return screws remote from said feed screws and said mounting means for said pusher means is on the side of said mounting means for said guide means remote from said return screws and including extensions on said guide means and on said pusher means, said extensions being held in engagement by said common resilient means.

References Cited in the file of this patent

UNITED STATES PATENTS

| | | |
|---|---|---|
| 2,602,965 | Denton | July 15, 1952 |
| 2,643,419 | Longstreet et al. | June 30, 1953 |